(No Model.)

B. STAUNTON.
ROTARY INDEX AND PHOTOGRAPH ALBUM.

No. 452,957. Patented May 26, 1891.

Witnesses:
Byron Bliss
H. R. Paul

Inventor:
Benjamin Staunton

UNITED STATES PATENT OFFICE.

BENJAMIN STAUNTON, OF DOUGLAS, WYOMING.

ROTARY INDEX AND PHOTOGRAPH-ALBUM.

SPECIFICATION forming part of Letters Patent No. 452,957, dated May 26, 1891.

Application filed November 4, 1889. Serial No. 329,257. (No model.)

*To all whom it may concern:*

Be it known that I, BENJAMIN STAUNTON, a a subject of the Queen of Great Britain, residing at Douglas, in the county of Converse and State of Wyoming, have invented a new and useful Improvement in Indexes, of which the following is a specification.

This invention relates to a rotary index, and has for its object to provide an index in which the leaves or plates are readily accessible and have a pivotal connection with a rotary support, so that said leaves or plates have an independent motion about their connection with the said support and a second motion with the said rotatory support.

A further object is to have the leaves or plates removably attached to the support, so that they can be replaced by others or two or more leaves can be removed for comparison or for any purpose desired.

Figure 1:
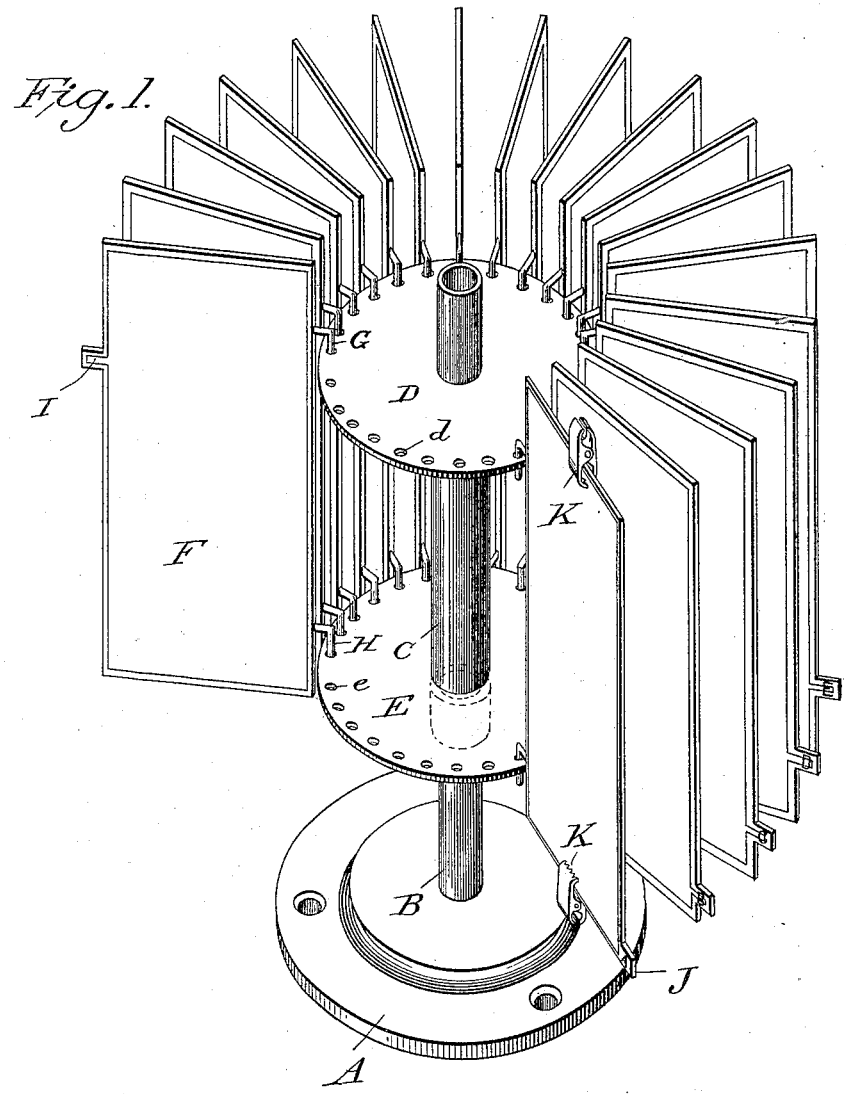
Figure 2:
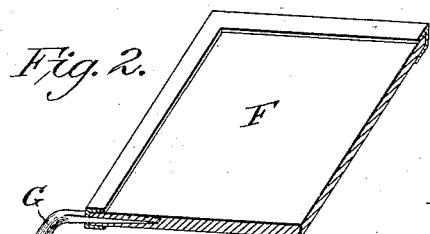

In the drawings, Figure 1 is a perspective view of the invention, some of the leaves or plates being removed. Fig. 2 is a perspective view showing the manner of attaching the bracket to the leaves or plates.

A is a suitable base, from which rises the standard B, on which is mounted a rotatory support comprising disks D and E and tubular connection C for the leaves or plates F, which are connected with said support so as to turn right or left independently thereof. These leaves or plates may be of any suitable material, and when the latter is light they are bound with metal, as shown, to stiffen and protect the said leaves or plates. There will be as many of these leaves as required, most generally one for each letter of the alphabet, twenty-six in all, as provided for in the drawings. Each leaf or plate will be provided with a tab J to receive the indicating letter or character. These tabs will be disposed at different elevations, so that if the leaves or plates were piled on one another the tabs would occupy the space from the top to the bottom of the leaves, being arranged in a progressive series. These tabs are likewise bound to strengthen them. Each leaf or plate has an upper bracket G and a lower bracket H. These brackets are inserted in corresponding openings $d$ and $e$ in the disks D and E, respectively, and have pivotal connection between the leaves or plates and the said rotatory support.

The matter for record may be written or otherwise affixed to the leaves or plates. If the matter be printed, the paper containing the said printed matter may be secured to the plates or leaves in any convenient manner, as by clips K, as shown.

Photographs, or, in fact, any printed matter for exhibition, can be readily fastened to the plates or leaves and can be readily found when required by rotating the support and turning the proper leaf either to the right or the left. Obviously both sides of the leaf may be used.

Having thus described my invention, what I desire to secure and claim by Letters Patent is—

1. An index for the purposes specified, comprising a rotatory support having upper and lower disks, which disks have coincident perforations close to their peripheral edge, and the leaves having upper and lower brackets, which are inserted in corresponding openings in the said disks, substantially as described, for the purposes specified.

2. The index and album hereinbefore shown and described, composed of a base having a vertical standard and a rotatory support mounted on the said standard and having upper and lower disks, which disks have coincident perforations near their peripheral edge, the leaves having tabs which are arranged in a progressive series, and having upper and lower brackets which are adapted to enter corresponding openings in the upper and the lower disks, substantially as set forth.

BENJAMIN STAUNTON.

Witnesses:
H. R. PAUL,
B. BLISS.